US012669836B2

(12) United States Patent
Abdelbadie et al.

(10) Patent No.: US 12,669,836 B2
(45) Date of Patent: Jun. 30, 2026

(54) BANDGAP REFERENCE CIRCUIT FOR PRODUCING FIXED REFERENCE SIGNALS

(71) Applicant: TEXAS INSTRUMENTS INCORPORATED, Dallas, TX (US)

(72) Inventors: Eslam Abdelbadie, Oslo (NO); Torunn Roraas, Oslo (NO)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 229 days.

(21) Appl. No.: 18/325,603

(22) Filed: May 30, 2023

(65) Prior Publication Data

US 2024/0402737 A1 Dec. 5, 2024

(51) Int. Cl.

*G05F 1/575* (2006.01)
*G05F 1/46* (2006.01)
*G05F 1/567* (2006.01)

(52) U.S. Cl.

CPC .............. *G05F 1/468* (2013.01); *G05F 1/567* (2013.01); *G05F 1/575* (2013.01)

(58) Field of Classification Search

CPC ..... G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/463; G05F 1/468; G05F 1/46; G05F 1/461; G05F 1/575; G05F 1/465; G05F 1/462; G05F 1/56; G05F 1/562; G05F 1/565; G05F 1/567; G05F 1/569; G05F 1/571; G05F 1/573; G05F 1/5735

See application file for complete search history.

(56) References Cited

U.S. PATENT DOCUMENTS

| | | | | |
|---|---|---|---|---|
| 8,531,235 B1 * | 9/2013 | Zonte | G05F 3/30 327/512 |
| 9,582,021 B1 * | 2/2017 | Arnold | G05F 3/16 |
| 10,606,292 B1 * | 3/2020 | Lai | G05F 3/30 |
| 10,613,572 B1 * | 4/2020 | Chu | G05F 1/561 |
| 2017/0077800 A1 * | 3/2017 | Qaiyum | G05F 3/267 |
| 2020/0192414 A1 * | 6/2020 | Mouret | G05F 3/267 |
| 2021/0157351 A1 * | 5/2021 | Kang | G05F 3/225 |
| 2023/0176604 A1 * | 6/2023 | Zonte | G11C 16/30 365/185.21 |
| 2023/0367350 A1 * | 11/2023 | Lee | G05F 3/225 |

* cited by examiner

*Primary Examiner* — Crystal L Hammond
*Assistant Examiner* — Nusrat Quddus
(74) *Attorney, Agent, or Firm* — Michelle F. Murray; Frank D. Cimino

(57) ABSTRACT

Embodiments disclosed herein relate to reference signals produced by integrated circuits. In an example, a reference circuit is provided. The reference circuit includes a first transistor, a second transistor, and an operational amplifier. The first transistor includes an input configured to couple to a voltage supply, an output coupled to a first resistor and a second resistor, and a control coupled to an output of the operational amplifier. The first resistor is coupled in series with a third resistor, and the second resistor is coupled in series with the second transistor. The second transistor includes an input and a control coupled with the second resistor and an output coupled to ground. The operational amplifier includes a first input coupled between the first and third resistors and a second input coupled between the second resistor and second transistor.

20 Claims, 5 Drawing Sheets

BANDGAP REFERENCE CIRCUIT FOR PRODUCING FIXED REFERENCE SIGNALS

TECHNICAL FIELD

This relates generally to reference circuits, and more particularly, to generating a reference signal using a reference circuit.

BACKGROUND

In electronic systems including integrated circuits, reference circuits are often included to provide a constant voltage and/or current reference signal to components within integrated circuits. A reference circuit can receive power from a power supply and produce a fixed reference current, or reference voltage when applied to a load, irrespective of changes in the power provided by the power supply or temperature swings in the integrated circuit, for example.

In order to produce fixed reference signals for use by downstream loads, traditional reference circuits often include several bipolar junction transistors (BJTs), among other electronic components, coupled together. However, solutions using BJTs are often bulky and can be susceptible to inaccurate modeling, which may result in noisy outputs. Further, BJTs suffer from leakage and other inefficiencies, and thus, can be problematic for use in integrated circuits.

Another alternative solution replaces BJTs in the reference circuit with complementary metal-oxide semiconductor (CMOS) transistors in an effort to reduce noise and inaccuracies. Despite such changes, however, various CMOS implementations that use accompanying transistors in sub-threshold regimes may rely on weak inversion designs, which can cause the reference circuit to suffer from mismatching, and further, can cause inaccuracies in the output reference signals.

Additionally, these example reference circuits and others often use multiple different components of a circuit(s) to generate the reference signal. One circuit component may be used to generate a characteristic of the reference signal that is proportional to absolute temperature (PTAT), while another circuit component may be used to generate a characteristic of the reference signal that is complementary to absolute temperature (CTAT). The components and/or circuits can then be coupled together to add the reference signals together to provide a reference signal that is fixed despite temperature fluctuations. Problematically, such designs introduce additional components and circuitry, which increases noise, cost, and other inaccuracies.

SUMMARY

Various embodiments disclosed herein relate to reference circuits, and more particularly, to producing a fixed reference signal with a single reference circuit for use by downstream loads despite fluctuations in input voltage, process variation, and temperature. A fixed reference signal, such as a current or a voltage, can be used by other circuits and subsystems, such as radio reference subsystems, timing subsystems, power management subsystems, and the like to ensure proper functionality and reduce power overloads, for example. In an example, a reference circuit is provided. The reference circuit includes a first transistor, a second transistor, and an operational amplifier. The first transistor includes an input configured to couple to a voltage supply, an output coupled to a first resistor and a second resistor, and a control coupled to an output of the operational amplifier. The first resistor is coupled in series with a third resistor, and the second resistor is coupled in series with the second transistor. The second transistor includes an input and a control coupled with the second resistor and an output coupled to ground. The operational amplifier includes a first input coupled between the first and third resistors and a second input coupled between the second resistor and second transistor.

This Summary is provided to introduce a selection of concepts in a simplified form that are further described below in the Detailed Description. It may be understood that this Summary is not intended to identify key features or essential features of the claimed subject matter, nor is it intended to be used to limit the scope of the claimed subject matter.

BRIEF DESCRIPTION OF THE DRAWINGS

The drawings are not necessarily drawn to scale. In the drawings, like reference numerals designate corresponding parts throughout the several views. In some embodiments, components or operations may be separated into different blocks or may be combined into a single block.

DETAILED DESCRIPTION

Figure 1:
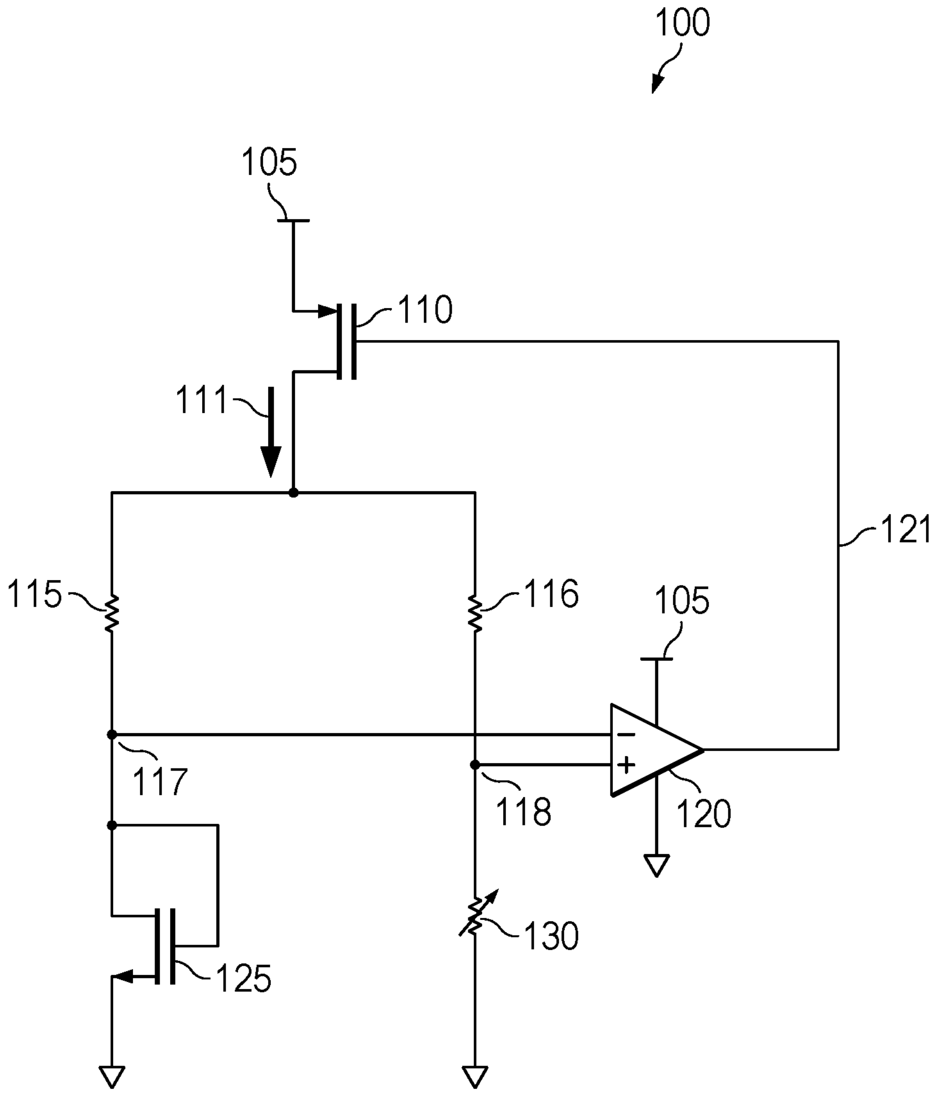
FIG. 1 illustrates an example reference circuit for producing a reference signal in accordance with an embodiment.

Discussed herein are enhanced components, techniques, and systems related to bandgap reference circuits, and more particularly, to producing a fixed reference signal using a single reference circuit. Often, integrated circuits, components thereof, and other electronic subsystems, require a constant or fixed reference voltage to perform various operations. A reference voltage input to a subsystem that fluctuates in value may cause issues to the subsystem. For example, a power management unit that receives a varying reference signal may not operate properly, which can cause harm to the power management unit itself or any loads coupled to the power management unit. Therefore, a reference circuit is needed that can provide a constant reference current or voltage despite variations in voltage supplied to the reference circuit, changes in temperature of the reference circuit or components thereof, demand from loads coupled to receive the reference current or voltage, and/or noise introduced outside or inside the reference circuit.

Some reference circuit solutions use bipolar junction transistors (BJTs) or complementary metal-oxide semiconductor (CMOS) transistors operating in a sub-threshold, weak inversion mode to produce fixed reference signals for use by loads. Another solution may use one or more diodes to produce the fixed reference signals. However, such solutions introduce several issues in the reference circuit and output signal, such as mismatching, modeling inaccuracies, and unwanted noise, among other problems due to parasitic and noisy characteristics or operating regimes. Additionally, several solutions to providing a fixed reference signal may include using multiple circuits. One or more components of a circuit may be used to produce a proportional to absolute temperature (PTAT) current, while one or more different components of the circuit may be used to produce a complementary to absolute temperature (CTAT) current. The PTAT and CTAT currents can be summed or subtracted to produce a single reference current that remains constant despite changes in temperature. These solutions are also prone to mismatching.

Instead, disclosed herein is a reference circuit that can produce a reference current having both PTAT and CTAT components without the use of multiple circuits, transistors operating in weak inversion, sub-threshold regimes, or other noisy, bulky components. The proposed reference circuit can include two transistors operating in a strong inversion region, various resistors, and an operational amplifier that provides a feedback loop to stabilize the produced reference current despite changes in voltage supplied to the reference circuit, temperature increases or decreases, or frequency changes in the voltage supply. Such a reference circuit can be coupled with various loads to provide a reference current or voltage that remains constant despite swings in various parameters. Advantageously, a reference circuit that can produce a reference current having both PTAT and CTAT components can reduce the overall cost of the solution as both the number of electronic components and the power consumption of the reference circuit can be reduced. Further, such a topology can provide for improved noise filtration and better immunity to mismatching issues.

In an example embodiment, a reference circuit is provided. The reference circuit includes a first transistor, a second transistor, and an operational amplifier. The first transistor includes an input configured to couple to a voltage supply, an output coupled to a first resistor and a second resistor, and a control coupled to an output of the operational amplifier. The first resistor is coupled in series with a third resistor, and the second resistor is coupled in series with the second transistor. The second transistor includes an input and a control coupled with the second resistor and an output coupled to ground. The operational amplifier includes a first input coupled between the first and third resistors and a second input coupled between the second resistor and second transistor.

In another example, an integrated circuit is provided that includes a start-up circuit, a load circuit, and a reference circuit. The reference circuit is coupled to the start-up circuit and the load circuit, and the reference circuit provides a reference current to the load circuit. The reference circuit includes a first transistor, a second transistor, and an operational amplifier. The first transistor includes an input configured to couple to a voltage supply, an output coupled to a first resistor and a second resistor, and a control coupled to an output of the operational amplifier. The first resistor is coupled in series with a third resistor, and the second resistor is coupled in series with the second transistor. The second transistor includes an input and a control coupled in series with the second resistor and an output coupled to ground. The operational amplifier includes a first input coupled to a first node between the first resistor and the third resistor and a second input coupled to a second node between the second resistor and the second transistor.

In yet another example, a reference circuit is provided. The reference circuit includes a first transistor, a second transistor, and an operational amplifier. The first transistor includes an input configured to couple to a voltage supply, an output coupled to a first resistor and a second resistor, and a control coupled to an output of the operational amplifier. The first resistor is coupled in series with a third resistor, and the second resistor is coupled in series with the second transistor. The third resistor is a variable resistor configured to control currents through the first and second resistors, among other components. The second transistor includes an input and a control coupled in series with the second resistor and an output coupled to ground. The operational amplifier includes a first input coupled to a first node between the first resistor and the third resistor and a second input coupled to a second node between the second resistor and the second transistor.

FIG. 1 illustrates an example reference circuit for producing a reference signal in accordance with an embodiment. FIG. 1 shows reference circuit 100 that includes transistor 110, resistor 115, resistor 116, operational amplifier 120, transistor 125, and variable resistor 130. Transistor 110 and operational amplifier 120 are coupled with a voltage supply (not shown) to receive supply voltage 105.

Reference circuit 100 is representative of a circuit capable of generating a reference voltage and current independent of supply voltage 105 for use by one or more downstream subsystems (not shown). Reference circuit 100 can produce a reference signal (e.g., voltage, current) with a constant value despite changes in supply voltage 105, such as voltage or temperature swings, or load requirements. For example, reference circuit 100 can produce a reference current 111 having both proportional to absolute temperature (PTAT) and complementary to absolute temperature (CTAT) components, such that the reference current 111 maintains a consistent value despite temperature fluctuations.

Reference circuit 100 includes various electrical components coupled together to produce the constant reference signal for one or more loads (not shown). Reference circuit 100 includes transistor 110, which may be coupled to a voltage supply that generates supply voltage 105. The voltage supply may be any type of power supply, circuit, or the like that produces supply voltage 105.

Transistor 110 may be representative of a p-type transistor, such as a complementary metal-oxide semiconductor (CMOS) field-effect transistor (FET). Transistor 110 includes an input, a control, and an output. The input of transistor 110, or the source, is coupled to the voltage supply to receive supply voltage 105. The control of transistor 110, or the gate, is coupled to an output of operational amplifier 120. The output of transistor 110, or the drain, is coupled to resistors 115 and 116. When transistor 110 receives supply voltage 105 from the voltage supply, transistor 110 can provide reference current 111 to resistors 115 and 116 via the output of transistor 110.

Resistors 115 and 116 of reference circuit 100 are arranged in separate branches. On one branch, resistor 115 may be coupled in series with transistor 125. On the other branch, resistor 116 may be coupled in series with resistor 130. In various examples, resistors 115 and 116 have substantially the same resistance (e.g., a difference of less than or equal to 10%). Thus, when reference current 111 is provided to resistors 115 and 116, the amount of current flowing through resistors 115 and 116 can be substantially the same. In other words, reference current 111 can be split into two equal currents across two branches within reference circuit 100 (i.e., half of reference current 111).

Transistor 125 may be representative of an n-type transistor, such as a CMOS FET. Transistor 125 includes an input, a control, and an output. The input of transistor 125, or the drain is coupled to a terminal of resistor 115. The control of transistor 125, or the gate, is coupled to the input of transistor 125. The output of transistor 125, or the source, is coupled to ground.

Resistor 130 is representative of a variable resistor. In various examples, the resistance of resistor 130 is pre-configured based on a desired operation of reference circuit 100. For example, resistor 130 may be configured to control the currents through components of reference circuit 100 based on the resistance of resistor 130, which may influence the CTAT and PTAT components of reference current 111. The resistance of resistor 130 may be measured, selected, changed or trimmed using a digital circuit (not shown). For instance, prior to fabrication of reference circuit 100, the resistance of resistor 130 may be selected using digital logic bits.

Due to resistors 115 and 116 having substantially equal resistance, when reference current 111 is fed to resistors 115 and 116, a voltage at node 117, located between resistor 115 and transistor 125, and a voltage at node 118, located between resistor 116 and resistor 130, may be equal to one another. The voltage at node 117 may be referred to herein as $V_x$, and the voltage at node 118 may be referred to herein as $V_y$.

Operational amplifier 120 is included in reference circuit 100 to produce output voltage 121 and provide output voltage 121 to the control of transistor 110 to function as a feedback loop for reference circuit 100 and balance the currents and voltages throughout reference circuit 100. Operational amplifier 120 includes two inputs coupled to branches of reference circuit 100 at nodes 117 and 118, respectively. More specifically, a first input of operational amplifier 120 is coupled to node 117, and a second input of operational amplifier 120 is coupled to node 118. The first input may be a negative input, and the second input may be a positive input. Operational amplifier 120 also includes a third input coupled to the voltage supply to receive supply voltage 105 and a fourth input coupled to ground. Based on the voltages input to operational amplifier 120 at node 117 and node 118, operational amplifier 120 can amplify the voltages to produce output voltage 121 at an output of operational amplifier 120, which can be coupled to the control of transistor 110. For example, if $V_x$ and $V_y$, inputs to operational amplifier 120, are not equal to each other, operational amplifier 120 can use a gain to produce output voltage 121 that balances reference current 111, and consequently, $V_x$ and $V_y$ to make them equal to each other.

In operation, transistor 110 can turn on when transistor 110 receives supply voltage 105 and produce reference current 111. Reference current 111 can flow through resistors 115 and 116, which can create a gate voltage across transistor 125 and produce $V_x$ and $V_y$ that feed into operational amplifier 120 to balance current values and voltage values among the components of reference circuit 100. However, over time, temperature of the components of reference circuit 100 may increase, which can cause a threshold voltage of transistor 125 to decrease. In other words, the gate voltage of transistor 125 may be affected due to a temperature increase, which may affect reference current 111. This means that the threshold voltage and gate voltage of transistor 125 have CTAT properties. To offset decreases in voltage across transistor 125 as temperature increases, the transconductance of transistor 125 can be influenced based on the value selected for resistor 130. Transconductance of transistor 125 refers to an amount of control the drain has on the control of transistor 125, or in other words, the relationship between the drain current and the gate voltage of transistor 125. In various examples, the transconductance of transistor 125 has PTAT properties, meaning that as temperature increases, voltage increases. It follows that the gate voltage and the transconductance may be balanced to produce a reference current 111 having both CTAT and PTAT properties.

In an example, the transconductance ($g_m$) of transistor 125 may be defined using the following equation, where $V_{GS}$ is the voltage across the control, or gate, of transistor 125, $I_D$ is the drain current of transistor 125, and $V_{th}$ is a threshold voltage:

$$g_m = 2I_D/V_{GS} - V_{th}$$

Accordingly, Vas can be defined using the following equation:

$$V_{GS} = \frac{2I_D}{g_m} + V_{th}$$

The value of reference current 111 may be further based on the resistance of resistor 130 as the resistor can affect the drain current and gate voltage of transistor 110. The drain current, $I_D$, can be redefined using the following equation, where R is the resistance of resistor 130:

$$I_D = \frac{V_{th}}{R - \frac{2}{g_m}}$$

Then, with $I_D$ defined, reference current ($I_{ref}$) 111 can be defined using the following equation:

$$I_{ref} = 2I_D = \frac{2V_{th}g_m}{Rg_m - 2}$$

As transistor 110 outputs reference current 111 to resistors 115 and 116, and reference current 111 is split into two currents that flow across resistors 115 and 116, $V_x$ and $V_y$ can be determined at nodes 117 and 118, respectively. In various examples, the following equation defines the voltages at nodes 117 and 118:

$$V_x = V_y = V_{GS} = I_D R$$

$V_x$ and $V_y$ may equal each other because resistors 115 and 116 have the same resistance. $V_x$ and $V_y$ may also equal $V_{GS}$ for transistor 125 because $V_x$ and $V_y$ are fed as inputs to operational amplifier 120. In use, operational amplifier 120 can receive $V_x$ and $V_y$ and can be configured to apply a gain to $V_x$ and $V_y$ and feed output voltage 121 to the control of transistor 110 to influence reference current 111, and consequently, $V_{GS}$. In an example where reference current 111 fluctuates due to a voltage increase in supply voltage 105 or a temperature increase in components of reference circuit 100, for example, operational amplifier 120 can provide output voltage 121 to update reference current 111. The transconductance of transistor 125 may be re-defined using the following equation, where un is the mobility of silicon of transistor 125, Cox is a capacitance of the control of transistor 125, W is the width of transistor 125, and L is the length of transistor 125:

$$g_m = \mu_n C_{ox} W/L(V_x - V_{th}) = K(V_x - V_{th})$$

It follows that reference current 111 can be further redefined using the following equation:

$$I_{ref} = \frac{2K\left(V_{th}V_x - V_{th}^2\right)}{RK(V_x - V_{th}) - 2}$$

In this equation, $$\left(V_{th}V_x - V_{th}^2\right),$$

can be considered a PTAT component, while $$\left(\frac{1}{(V_x - V_{th})}\right)$$

can be considered a CTAT component. Reference current 111 produced by elements of reference current 111 can include both PTAT and CTAT components and be considered proportional to PTAT and inversely proportional to CTAT. Thus, by using these parameters to understand influences on reference current 111, a value of resistor 130 can be selectively chosen to balance reference circuit 100.

In various examples, transistors 110 and 125 may operate in the strong inversion region. However, other methods of operating transistors 110 and 125 and other types of transistor 110 and 125 may be contemplated.

Figure 2:
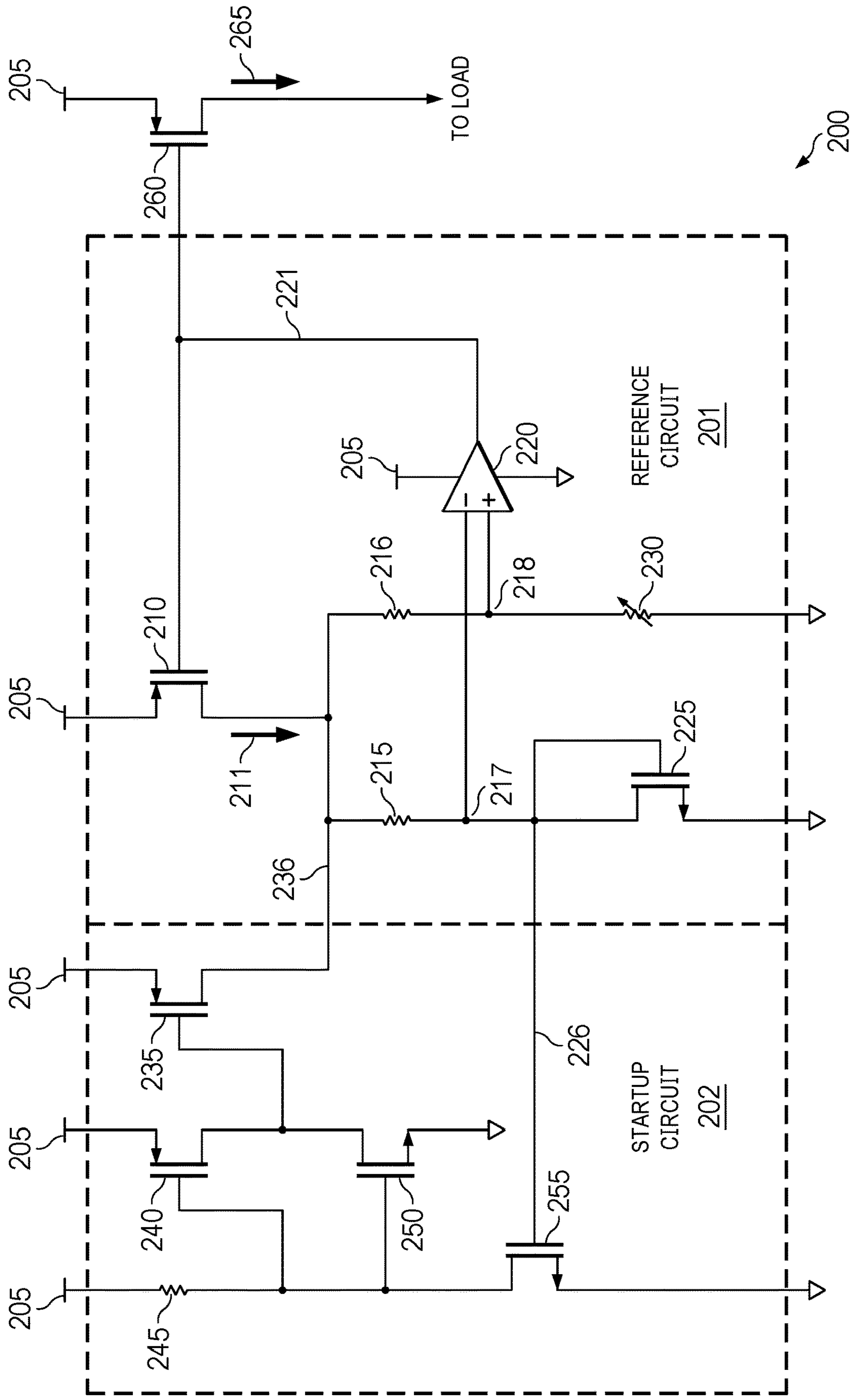
FIG. 2 illustrates an example system for producing a reference signal in accordance with an embodiment.

FIG. 2 illustrates an example system for producing a reference signal in accordance with an embodiment. FIG. 2 includes reference circuit 201 and startup circuit 202. Components of both reference circuit 201 and startup circuit 202 may be coupled with a voltage supply (not shown) to receive a supply voltage 205. Additionally, elements of reference circuit 201 and startup circuit 202 may be coupled to each other. Reference circuit 201 can produce output current 265, which can be provided to one or more loads (not shown)

Reference circuit 201 is representative of a circuit capable of generating a reference voltage and current (output current 265) independent of supply voltage 205 for use by one or more downstream subsystems. For example, reference circuit 201 may be representative of reference circuit 100 of FIG. 1. Reference circuit 201 can produce a reference signal (e.g., voltage, current) with a constant value despite changes in supply voltage 205, such as voltage or temperature swings, or requirements of a load. For example, reference circuit 201 can produce a reference current 211 having both PTAT and CTAT components, such that the reference current 211 maintains a consistent value despite temperature fluctuations.

Reference circuit 201 includes various electrical components coupled together to produce the fixed output current 265 for one or more loads (not shown). Reference circuit 201 includes transistor 210, which may be coupled to a voltage supply that generates supply voltage 205. The voltage supply may be any type of power supply, circuit, or the like that produces supply voltage 205.

Transistor 210 may be representative of a p-type transistor that includes an input, a control, and an output. The input of transistor 210, or the source, is coupled to the voltage supply to receive supply voltage 205. The control of transistor 210, or the gate, is coupled to an output of operational amplifier 220. The output of transistor 210, or the drain, is coupled to resistors 215 and 216. When transistor 210 receives supply voltage 205 from the voltage supply, transistor 210 can provide reference current 211 to resistors 215 and 216 via the output of transistor 210.

Resistors 215 and 216 of reference circuit 201 are arranged in separate branches. On one branch, resistor 215 may be coupled in series with transistor 225. On the other branch, resistor 216 may be coupled in series with resistor 230. In various examples, resistors 215 and 216 have substantially the same resistance. Thus, when reference current 211 is provided to resistors 215 and 216, the amount of current flowing through resistors 215 and 216 can be the same. In other words, reference current 211 can be split into two equal currents across two branches within reference circuit 201 (i.e., half of reference current 211).

Transistor 225 may be representative of an n-type transistor that includes an input, a control, and an output. The input of transistor 225, or the drain, is coupled to a terminal of resistor 215. The control of transistor 225, or the gate, is coupled to the input of transistor 225. The output of transistor 225, or the source, is coupled to ground.

Resistor 230 is representative of a variable resistor. In various examples, the resistance of resistor 230 is preconfigured based on a desired operation of reference circuit 100. For example, resistor 230 may be configured to control the currents through resistors 215 and 216, among other components, based on the resistance of resistor 230. The resistance of resistor 230 may be measured, selected, changed or trimmed using a digital circuit (not shown).

Because resistors 215 and 216 may have substantially equal resistance, the voltage at node 217, located between resistor 215 and transistor 225, and the voltage at node 218, located between resistor 216 and resistor 230, may be equal to one another. Operational amplifier 220 is included in reference circuit 201 to produce output voltage 221 and provide output voltage 221 to the gate of transistor 210 to function as a feedback loop for reference circuit 201. Operational amplifier 220 includes two inputs coupled to branches of reference circuit 201 at nodes 217 and 218, respectively. More specifically, a first input of operational amplifier 220 is coupled to node 217, and a second input of operational amplifier 220 is coupled to node 218. The first input may be a negative input, and the second input may be a positive input. Operational amplifier 220 also includes a third input coupled to the voltage supply to receive supply voltage 205 and a fourth input coupled to ground. Based on the voltages input to operational amplifier 220 at node 217 and node 218, operational amplifier 220 can produce output voltage 221 at an output of operational amplifier 220, which can be coupled to the control of transistor 210.

Startup circuit 202 is representative of a circuit coupled to reference circuit 201 configured to sense a current of reference circuit 201 (gate voltage 226) and provide a current (startup current 236) to one or more elements of reference circuit 201 in the case that reference circuit 201 is off, or not producing gate voltage 226, and consequently, reference current 211.

Startup circuit 202 includes transistor 235, transistor 240, resistor 245, transistor 250, and transistor 255. Transistor 235 and transistor 240 may be p-type transistors, and transistors 250 and 255 may be n-type transistors. Each of transistors 235, 240, 250, and 255 may include an input (i.e., source or drain), a control (i.e., gate), and an output (i.e., source or drain), which may be coupled to various elements and nodes within startup circuit 202 and reference circuit 201.

The voltage supply may be coupled to resistor 245 and to the inputs, or sources, of transistors 235 and 240 to provide supply voltage 205 to transistor 235, transistor 240, and resistor 245. Resistor 245 may be coupled in series with transistor 255. The control of transistor 235 and the output, or drain, of transistor 240 may be coupled to the input, or drain, of transistor 250. The control of transistor 240 and the control of transistor 250 may be coupled to a node between resistor 245 and transistor 255, and thus, may be coupled to the input, or drain, of transistor 255. The outputs, or sources, of transistor 250 and 255 may be coupled to ground nodes. The output, or drain, of transistor 235 and the control of transistor 255 may be coupled to elements of reference circuit 201. More specifically, the output of transistor 235 may be coupled to a node that is coupled to both resistors 215 and 216 of reference circuit 201 and may provide startup current 236 to resistors 215 and 216 of reference circuit 201. The control of transistor 255 may be coupled to a node between resistor 215 and transistor 225. More specifically, the input and control of transistor 225 can be coupled to the control of transistor 255, such that transistor 255 can provide a gate voltage 226 to transistor 255.

In operation, reference circuit 201 can receive supply voltage 205 to produce reference current 211 at a constant value despite changes in supply voltage 205 or changes in temperature of reference circuit 201. To do so, reference current 211 can pass through branches of reference circuit 201 which may split reference current 211 across resistors 215 and 216. Nodes 217 and 218 following resistors 215 and 216 on respective branches can be coupled to inputs of operational amplifier 220 which can compare the voltage at node 217 between resistor 215 and transistor 225 and the voltage at node 218 between resistor 216 and resistor 230. Operational amplifier 220 can use a gain parameter to produce output voltage 221 that can be fed to transistor 210 at the control of transistor 210. Transistor 210 can use output voltage 221 to influence reference current 211. Advantageously, transistor 210 can produce reference current 211 with a constant value despite fluctuations in supply voltage 205 based on output voltage 221.

As reference current 211 is split among the branches of reference circuit 201, transistor 225 receives a current as an input via resistor 215. Transistor 225 can use this input current to produce gate voltage 226 and output gate voltage 226 from the control of transistor 225, which is coupled to the control of transistor 255 of startup circuit 202. Transistor 255 can turn off based on gate voltage 226 being a value other than zero, or any other determined value, such that other transistors of startup circuit do not turn on and produce startup current 236.

Alternatively, in an example where reference circuit 201 is not on, or not producing reference current 211, transistor 225 may not receive an input current, and thus, may not produce gate voltage 226. In such examples, current through transistor 255 may mirror current through transistor 225 and also equal zero. Because there is no current flowing through transistor 255, there may be no voltage difference across resistor 245. With no voltage difference across 245, the control of transistor 240 can be pulled to supply voltage 205, which may cause transistor 240 to turn off. Accordingly, transistor 250 can be pulled to ground, which ultimately forces transistor 235 to turn on and produce startup current 236 based on supply voltage 205. Startup current 236 can be provided to resistors 215 and 216 of reference circuit 201 and flow through resistors 215 and 216. Operational amplifier 220 can receive input voltages at nodes 217 and 218 based on startup current 236 to produce output voltage 221 to turn transistor 210 and begin generating reference current 211. After transistor 225 receives current and produces gate voltage 226, transistor 255 can receive gate voltage 226, which can flow to resistor 245 and create a voltage difference across resistor 245. Due to the voltage difference across resistor 245, transistor 240 can turn on and transistor 250 can turn off. When transistor 240 turns on and transistor 250 turns off, transistor 240 can provide supply voltage 205 at its output, which is coupled to the control of transistor 235. Accordingly, transistor 235 can turn off and stop producing startup current 236.

In either example, reference circuit 201 can ultimately produce reference current 211 that has PTAT and CTAT components, and thus, can remain within a consistent, constant current range despite fluctuations in temperature or supply voltage 205. Reference current 201 can mirror such current and provide the current to transistor 260 via the control of transistor 210. Transistor 260 can produce output current 265, which may have the same value as reference current 211, and ultimately, have both PTAT and CTAT components. In various examples, transistor 260 can be coupled to one or more loads to provide output current 265 to the loads. In other examples, transistor 260 can be further coupled to a resistor (not shown) to provide an output voltage to the loads.

For example, a load that can be coupled to transistor 260 may be representative of any load that uses a reference current to perform various electrical, mechanical, electro-mechanical, or the like, operations. The load(s) may include one or more circuits including hardware, software, firmware, or any combination or variation thereof. For example, the load(s) may include one or more radio reference subsystems, a power management subsystem, an oscillator or timing reference subsystem, or the like.

Figure 3:
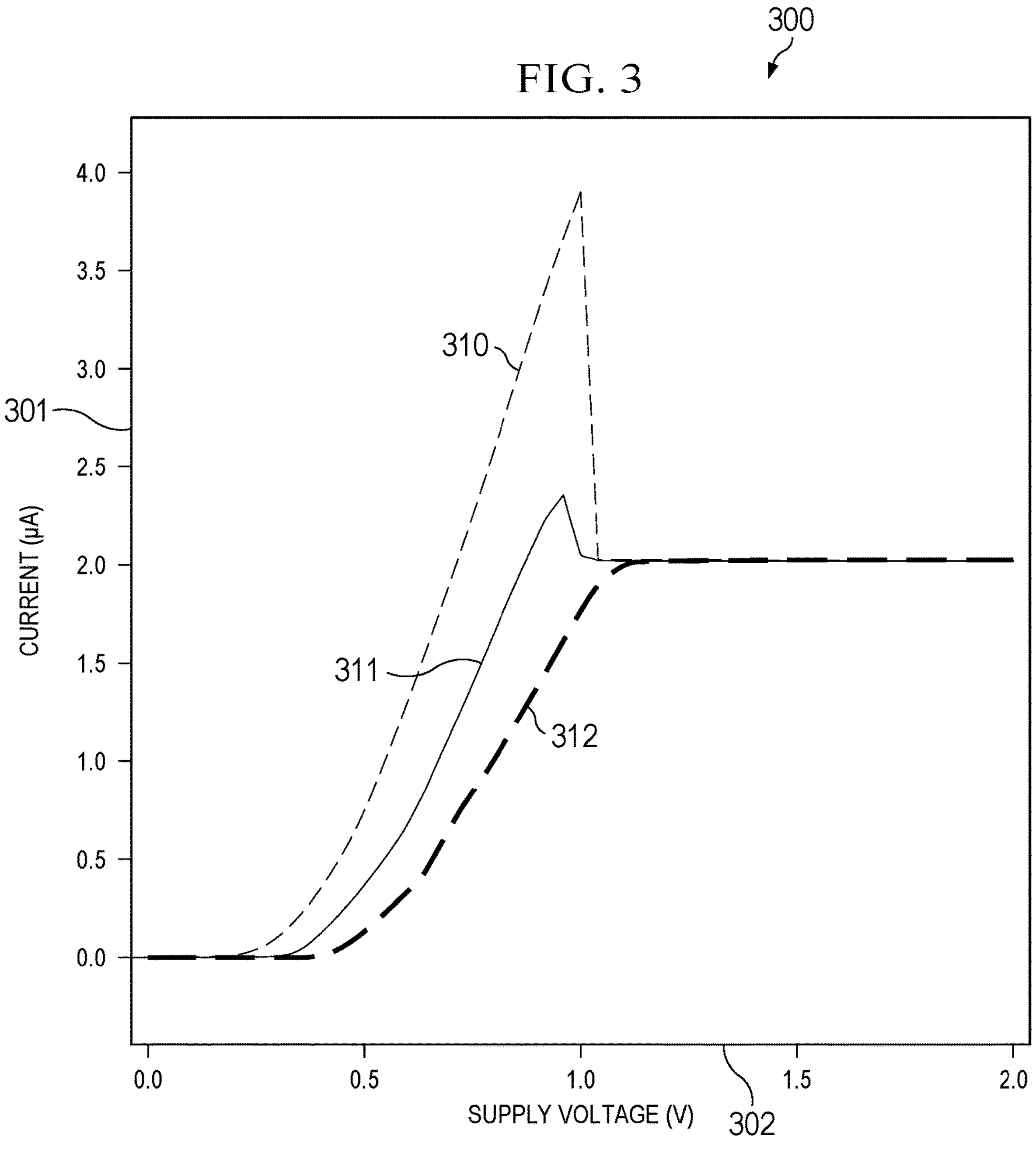
FIG. 3 illustrates an example graphical representation related to a reference signal with respect to voltage of a voltage supply in accordance with an embodiment.

FIG. 3 illustrates an example graphical representation related to a reference signal with respect to voltage of a voltage supply in accordance with an embodiment. FIG. 3 shows graphical representation 300, which includes sample results with respect to reference current 301 and supply voltage 302. Signals 310, 311, and 312 shown in graphical representation 300 may be produced by components of a reference circuit system, such as reference circuit 201 of FIG. 2, and a voltage supply capable of providing a supply voltage to a reference circuit system, such as supply voltage 205 of FIG. 2.

Signals 310, 311, and 312 are representative of reference currents output by a reference circuit. For example, signal 310 may represent a strong current output produced by a first reference circuit. Signal 311 may represent a nominal current output produced by a second reference circuit different from the first reference circuit. Signal 312 may represent a weak current output produced by a third reference circuit different from the first and second reference circuits.

As illustrated, signals 310, 311, and 312 increase with respect to current 301 as supply voltage 302 fed to the reference circuit increases. However, signals 310, 311, and 312 flatten out and reach a constant, fixed value of approximately 2.0 microamps when supply voltage 302 reaches approximately 1.05 volts (V). Signals 310, 311, and 312 can maintain this current despite increases in supply voltage 302 at least up to 2.0 V. Accordingly, a reference circuit can produce a fixed reference current regardless of changes in voltage supplied by a power source within a range.

Figure 4:
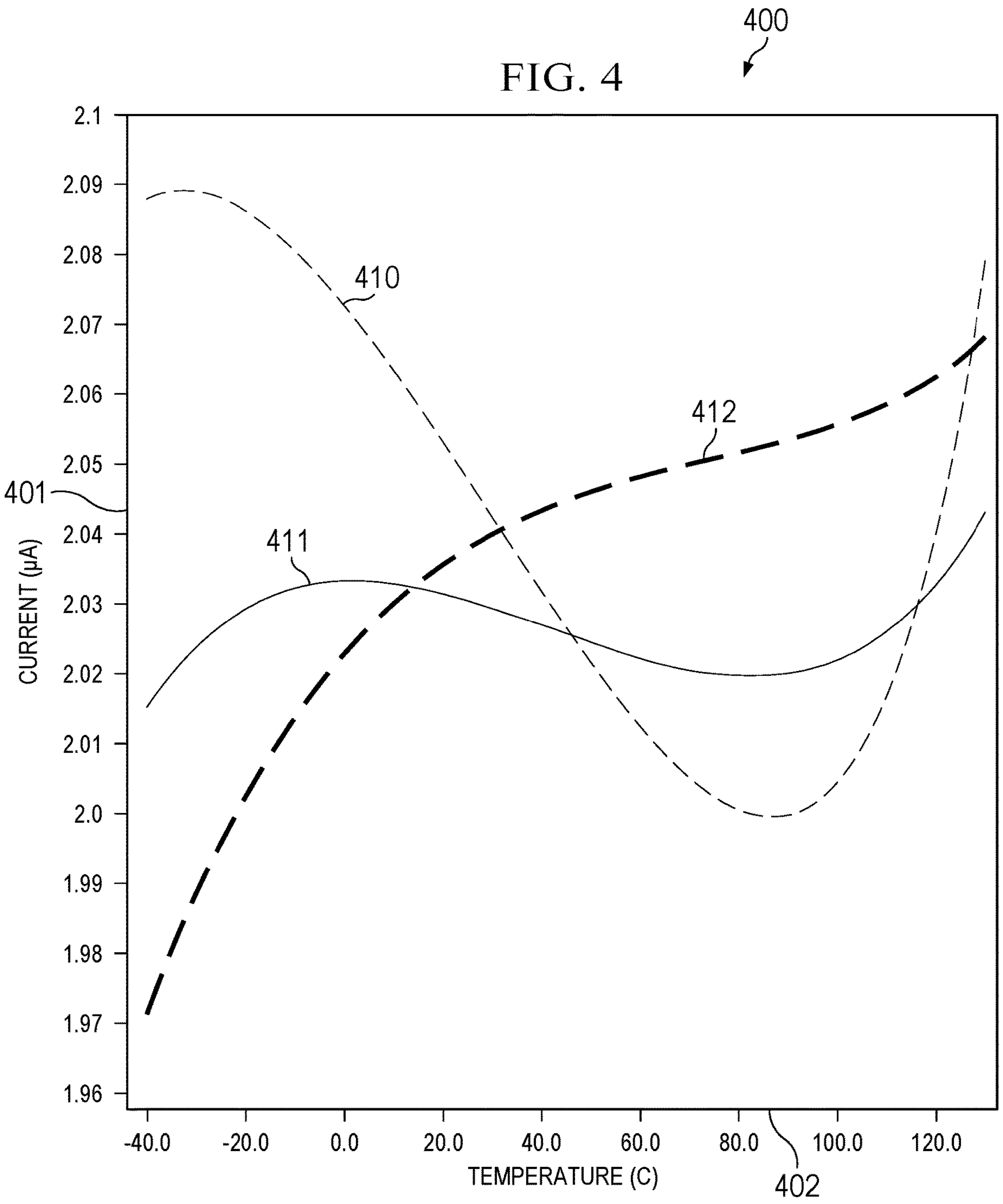
FIG. 4 illustrates an example graphical representation related to a reference signal with respect to temperature in accordance with an embodiment.

FIG. 4 illustrates an example graphical representation related to a reference signal with respect to temperature in accordance with an embodiment. FIG. 4 shows graphical representation 400, which includes sample results with respect to reference current 401 and temperature 402. Signals 410, 411, and 412 shown in graphical representation 400 may be produced by components of a reference circuit system, such as reference circuit 201 of FIG. 2, and a voltage supply capable of providing a supply voltage to a reference circuit system, such as supply voltage 205 of FIG. 2.

Signals 410, 411, and 412 are representative of reference currents output by a reference circuit. For example, signal 410 may represent a strong current output produced by a first reference circuit. Signal 411 may represent a nominal current output produced by a second reference circuit different from the first reference circuit. Signal 412 may represent a weak current output produced by a third reference circuit different from the first and second reference circuits.

As illustrated, signals 410, 411, and 412 fluctuate with respect to current 401 as temperature 402 of the reference circuit varies. For example, signal 410 decreases as temperature increases from −40 C to 80 C then increases as temperature increases from 80 C to 130 C. Signal 411 increases as temperature increases from −40 C to 0 C, decreases as temperature increases from 0 C to 80 C, then increases as temperature increases from 80 C to 130 C. Signal 412 increases as temperature increases from −40 C to 130 C. Despite such fluctuations with respect to current 401, the amount of change even despite such large variations in temperature 402 is small. By way of example, signal 411 varies only within hundredths of microamps throughout large swings of temperature 402. Thus, a reference circuit can produce a reference current that remains constant, or near constant, as temperature increases or decreases.

Figure 5:
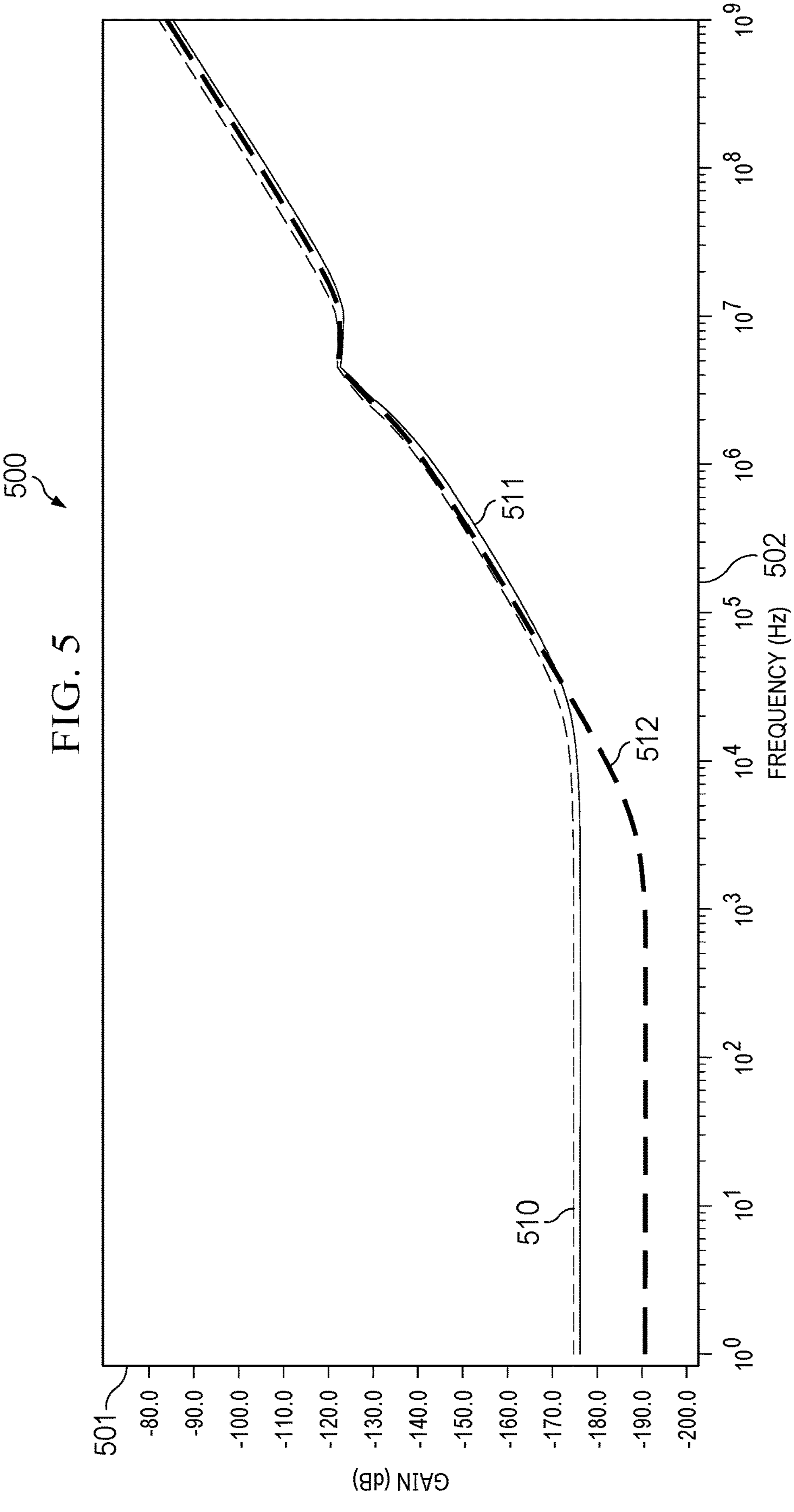
FIG. 5 illustrates an example graphical representation related to voltage gain with respect to frequency in accordance with an embodiment.

FIG. 5 illustrates an example graphical representation related to power supply rejection ratio (PSRR) with respect to frequency in accordance with an embodiment. FIG. 5 shows graphical representation 500, which includes sample results with respect to gain 501 and frequency 502. Signals 510, 511, and 512 shown in graphical representation 500 may be produced by components of a reference circuit system, such as reference circuit 201 of FIG. 2, and a voltage supply capable of providing a supply voltage to a reference circuit system, such as supply voltage 205 of FIG. 2.

Signals 510, 511, and 512 are representative of voltage gains output by a reference circuit. More specifically, signals 510, 511, and 512 demonstrate a gain value determined by dividing output voltage (e.g., output current 265 of FIG. 2 applied over a resistor) by input voltage (e.g., supply voltage 205 of FIG. 2). The values of signals 510, 511, and 512 indicate the respective reference circuit's ability to reject ripple, of various frequencies, injected at inputs of the respective reference circuit. For example, signal 510 may represent a strong gain produced by a first reference circuit. Signal 511 may represent a nominal gain output produced by a second reference circuit different from the first reference circuit. Signal 512 may represent a weak gain output produced by a third reference circuit different from the first reference circuit and the second reference circuit.

As illustrated, signals 510, 511, and 512 produce constant values despite increases in frequency 502 of ripple supplied by a power supply, then signals 510, 511, and 512 increase nearly linearly after frequency 502 increases beyond a range. For example, signals 510 and 511 may maintain a constant value of approximately −175 decibels (dB) as frequency 502 increases from 0 hertz (Hz) to 1.0 kHz. Signal 512 may maintain a constant value of approximately −190 dB within the same range of frequency 502. Accordingly, this means that the reference circuit can produce an output voltage, demonstrated with respect to gain 501, that has fixed values despite increasing noise and ripple injected into the reference circuit by a power supply.

While some examples provided herein are described in the context of a clock gating system, subsystem, component, device, architecture, or environment, it should be understood that the clock gating systems, logic subsystems, and other systems and methods described herein are not limited to such embodiments and may apply to a variety of other processes, systems, applications, devices, and the like. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Unless the context clearly requires otherwise, throughout the description and the claims, the words "comprise," "comprising." and the like are to be construed in an inclusive sense, as opposed to an exclusive or exhaustive sense; that is to say, in the sense of "including, but not limited to." As used herein, the terms "connected." "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A reference circuit, comprising:
a first transistor;
a second transistor;
a first resistor;
a second resistor;
a third resistor; and
an operational amplifier including a positive input terminal and a negative input terminal;
wherein the first transistor includes a current path terminal, and a control terminal coupled to an output of the operational amplifier;
wherein the first resistor includes a first terminal coupled to the current path terminal of the first transistor, and a second terminal coupled to the positive input terminal of the operational amplifier;
wherein the second resistor includes a first terminal coupled to the current path terminal of the first transistor, and a second terminal coupled to the negative input terminal of the operational amplifier;
wherein the second transistor includes a current path terminal coupled to the negative input terminal of the operational amplifier, and a control terminal coupled to the current path terminal of the second transistor; and
wherein the third resistor includes a first terminal coupled to the positive input terminal of the operational amplifier, and a second terminal coupled to a ground terminal.

2. The reference circuit of claim 1, wherein the reference circuit is configured to provide a reference current that comprises a proportional to absolute temperature (PTAT) component and a complementary to absolute temperature (CTAT) component.

3. The reference circuit of claim 1, wherein the third resistor is a variable resistor configurable to control a first current through the first resistor and a second current through the second resistor.

4. The reference circuit of claim 3, wherein a resistance of the variable resistor is selected based on a desired value for the first and second currents.

5. The reference circuit of claim 1, wherein a voltage of a voltage supply coupled to the first transistor changes based on a temperature of the voltage supply.

6. The reference circuit of claim 1, wherein a start-up circuit is coupled to the first terminals of the first and second resistors.

7. The reference circuit of claim 6, wherein the start-up circuit is further coupled to the current path terminal of the second transistor.

8. The reference circuit of claim 7, wherein the start-up circuit receives a divided reference current at the current path terminal of the second transistor.

9. The reference circuit of claim 8, wherein the start-up circuit provides, to the first resistor and the second resistor, a start-up current based on the divided reference current.

10. The reference circuit of claim 1, wherein a load circuit is coupled to the control terminal of the first transistor to receive a reference current.

11. A circuit, comprising:
a start-up circuit;
a load circuit; and
a reference circuit coupled to the start-up circuit and the load circuit and
configurable to provide a reference current to the load circuit;
wherein the reference circuit comprises:
a first transistor;
a second transistor;
a first resistor;
a second resistor;
a third resistor; and
an operational amplifier including a positive input terminal and a negative input terminal;
wherein the first transistor includes a current path terminal, and a control terminal coupled to an output of the operational amplifier;
wherein the first resistor includes a first terminal coupled to the current path terminal of the first transistor, and a second terminal coupled to the positive input terminal of the operational amplifier;
wherein the second resistor includes a first terminal coupled to the current path terminal of the first transistor, and a second terminal coupled to the negative input terminal of the operational amplifier;
wherein the second transistor includes a current path terminal coupled to the negative input terminal of the operational amplifier, and a control terminal coupled to the current path terminal of the second transistor; and wherein the third resistor includes a first terminal coupled to the positive input terminal of the operational amplifier, and a second terminal coupled to a ground terminal.

12. The circuit of claim 11, wherein the reference current comprises a proportional to absolute temperature (PTAT) component and a complementary to absolute temperature (CTAT) component.

13. The circuit of claim 11, wherein the third resistor is a variable resistor configurable to control a first current through the first resistor and second current through the second resistor.

14. The circuit of claim 13, wherein a resistance of the variable resistor is selected based on a desired value for the first and second currents.

15. The circuit of claim 11, wherein a voltage of a voltage supply changes based on a temperature of the voltage supply.

16. The circuit of claim 11, wherein the start-up circuit comprises a plurality of transistors.

17. The circuit of claim 16, wherein a first transistor of the start-up circuit is coupled to the current path terminal of the second transistor and receives a divided reference current from the reference circuit.

18. The circuit of claim 17, wherein a second transistor of the start-up circuit is coupled to the current path terminal of the first transistor and to the first terminals of the first and second resistors of the reference circuit and provides a start-up current to the first and second resistors based on the divided reference current.

19. The circuit of claim 11, wherein the load circuit is coupled to the control terminal of the first transistor of the reference circuit.

20. A reference circuit, comprising:

a first transistor;

a second transistor;

a first resistor;

a second resistor;

a variable resistor; and an operational amplifier;

wherein the first transistor includes a current path terminal, and a control terminal coupled to an output of the operational amplifier;

wherein the first resistor includes a first terminal coupled to the current path terminal of the first transistor, and a second terminal coupled to the operational amplifier;

wherein the second resistor includes a first terminal coupled to the current path terminal of the first transistor, and a second terminal coupled to the operational amplifier;

wherein the second transistor includes a current path terminal coupled to the operational amplifier, and a control terminal coupled to the current path terminal of the second transistor; and wherein the variable resistor includes a first terminal coupled to the operational amplifier, and a second terminal coupled to a ground node, and is configurable to control a first current through the first resistor and a second current through the second resistor.

* * * * *